June 30, 1925.
W. D. KAHN ET AL
1,544,236
PORTABLE ELECTRIC LIGHT
Filed April 7, 1922
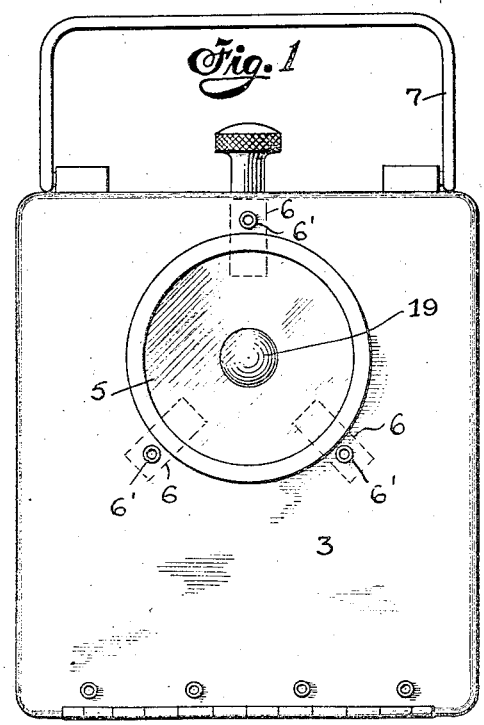
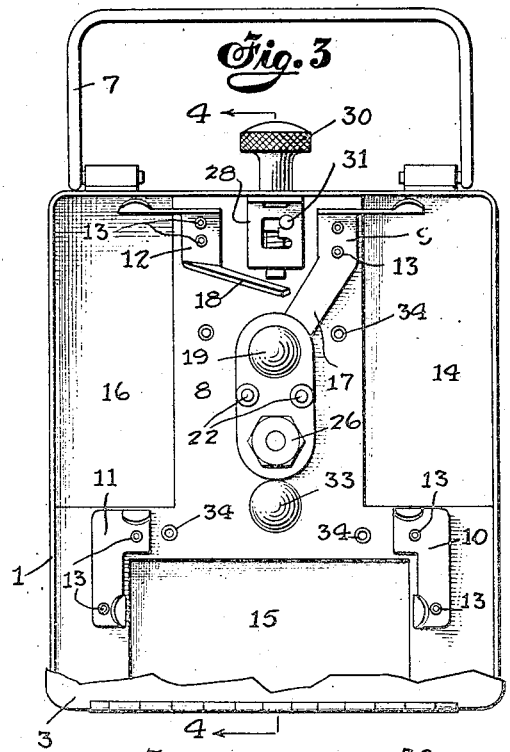
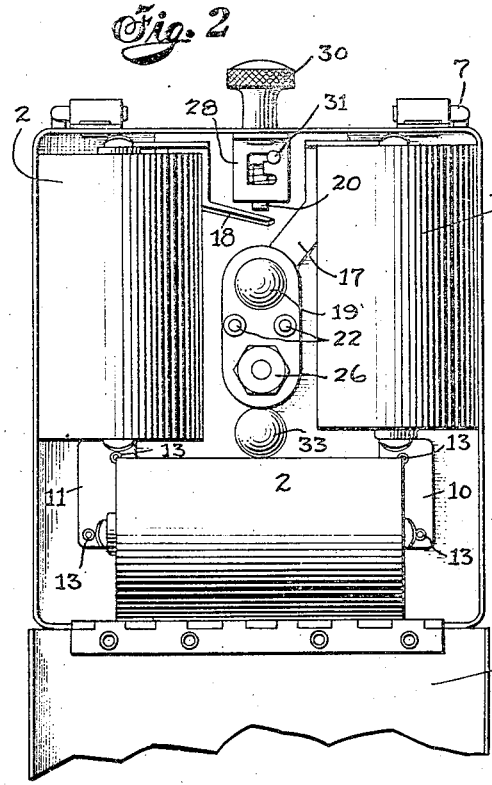
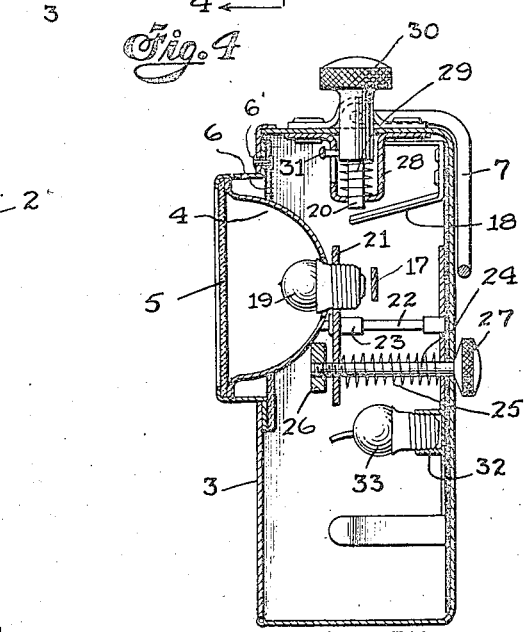
INVENTOR
WALTER D. KAHN
GEORGE A. THOMSON
BY
ATTORNEYS Patented June 30, 1925.

1,544,236

UNITED STATES PATENT OFFICE.

WALTER D. KAHN, OF WEST ORANGE, AND GEORGE A. THOMSON, OF NEWARK, NEW JERSEY, ASSIGNORS TO DIAMOND ELECTRIC SPECIALTIES CORPORATION, OF NEWARK, NEW JERSEY, A CORPORATION OF NEW JERSEY.

PORTABLE ELECTRIC LIGHT.

Application filed April 7, 1922. Serial No. 550,322.

*To all whom it may concern:*

Be it known that we, WALTER D. KAHN, a citizen of the United States, and a resident of West Orange, county of Essex, and State of New Jersey, and GEORGE A. THOMSON, a citizen of the United States, and a resident of Newark, county of Essex, and State of New Jersey, have invented an Improvement in Portable Electric Lights, of which the following is a specification.

Our invention relates to a portable electric light adapted to be operated from dry cells or other suitable source of current and aims to provide a structure of the class described, which is compact and of convenient form and is adapted to take cells of a relatively large size in a relatively small case, thus producing a light which has a long life without being so bulky as to be inconvenient to the user.

Our invention also aims to provide a device which is readily and cheaply made and assembled and which has the minimum number of parts of rugged construction and will stand considerable rough usage without being put out of order.

Our improved device embodies many improvements over the devices of this particular character known to the prior art, of which we may cite the ability to open the case to inspect the parts while all of the parts are in operating condition, the provision of a simple but exact focusing device, the provision of a switch of improved type, etc.

In the drawings accompanying this specification:

Fig. 1 shows a front view of our improved lamp;

Fig. 2 a front view of the cover removed, the cells being in plane;

Fig. 3 a front view of the cover and cells removed; and

Fig. 4 a sectional view taken on the line 4—4 of Fig. 3.

Referring to the drawings, it will be seen that our improved device comprises a case 1 which may be conveniently formed of metal and is deep enough to contain the cells 2, the switch and other mechanism. The case is covered by a hinged cover 3 in which is mounted a reflector 4 and lens 5 which may be conveniently held in place by means of the spring clips 6. Reflector 4, lens 5 and the bezel holding the lens are assembled in the case in one unit, clips 6 being riveted to the front of the case by eyelets 6', which pass through the clips, bezel and front of the case, thus affording a very simple assembly and because of the resiliency of clips 6 providing a very efficient shock adsorber for the lens and reflector. Should it be desired to remove the reflector or lens, clips 6 are rotated upon the eyelets to permit removal of the reflector. The arrangement is preferably such that the reflector extends inwardly into the case 1 and the cells 2 are grouped about the reflector as clearly shown in Fig. 2. Suitable means for holding the cover 3 closed and a suitable bail or handle 7 are provided.

Referring to Fig. 3, it will be seen that at the back of the case 1 there is provided a base 8 of fibre or other suitable insulating material upon which are mounted the contact clips 9, 10, 11 and 12, these clips being held in place by means of eyelets 13, or in any other suitable manner. The base 8 is cut away as at 14, 15, and 16, to permit the cells 2 to be set into the case and held in position to some extent by means of the edges of the cut-away portions, thus relieving the clips from a certain amount of the work of holding the cells in place. Clips 9 and 12 are provided with spring extensions 17 and 18 respectively. The extension 17 of clip 9 is adapted to engage one of the contacts of the lamp 19 and the spring extension 18 of the clip 12 is adapted to engage the plunger of the switch 20.

The lamp 19 is screwed into a threaded aperture in the movable plate 21 which is guided by means of posts 22, upon which eyelets 23 carried by plate 21 run. It may thus be moved in and out by the rotation of the screw 24, but being mounted on two posts can not turn. The screw 24 is in threaded engagement with the plate 21, and if desired, a spring 25 may be carried by the screw 24, tending to force the lamp into its outward position and acting as a shock absorber to take up the force of shocks which might cause breakage of the filament of the lamp 19. A suitable limit stop 26 is provided. By the rotation of screw 24 through the knurled head 27 or any other suitable means, the lamp may be moved inwardly and outwardly in the reflector and thus the light may be focused. It will be noted that the spring extension 17 of the clip 9 follows the lamp in its movement and a satisfactory contact is thus maintained at all times, irrespective of the adjustment of the lamp to focus.

The switch comprises the plunger 20, guided in the yoke 28, which yoke is provided with suitable apertures as will be hereafter explained and the coil spring 29 tending to force the switch into the open position. Plunger 20 cooperates with extension 18 of the clip 12, which extension, being flexible, allows for a slight movement in response to a pressure upon the plunger, and being set at a slight angle as indicated, will insure a wiping contact, thus insuring a clean switch surface.

Plunger 20 is provided at the top with a suitable operating knob 30 and at a convenient point intermediate its length with a locking pin 31 operating in an aperture in the yoke 28. This aperture is U-shaped, so that if the plunger 20 is depressed against action of spring 29 to meet the spring extension 18, a contact will be made only during the time that the plunger is held in the depressed position. If, however, when held in the depressed position, the plunger is turned so that the pin 31 will enter the lower leg of the U-shaped aperture, the plunger will be held locked in the depressed position and permanent illumination will be provided. If it is desired to lock the switch, so as to prevent operation of the device by accidental depression of the switch plunger, it is only necessary to turn the switch so that the pin 31 enters the upper leg of the U, as shown in Fig. 3, in which position the plunger will be locked.

Attached to the fibre base 8 is an auxiliary socket 32 carrying a spare lamp 33. This lamp is not in circuit, but we have found it advisable to have a spare lamp available, and have therefore designed this apparatus in such a manner that the spare lamp, while easily available, is protected from damage.

The fibre base 8 may be held in position by means of eyelets or rivets 34 passing through the rear wall of the case 1, it being understood, however, that suitable insulation is provided to prevent short-circuits between the eyelets 13 holding the clips in place.

We do not intend to confine ourselves to the particular modification shown and described since many changes may be made without departing from the spirit of our invention.

What we claim is:

1. In a device of the kind described, a switch comprising a plunger, a yoke within which the plunger is adapted to be moved and having a U-shaped aperture and a pin carried by the plunger and cooperating with the aperture in the yoke, so that the switch may be locked either in the "on" or the "off" position, or moved freely from one position to the other.

2. In a device of the kind described, a switch comprising a plunger, an apertured yoke within which the lower end of said plunger is adapted to operate, a spring interposed between the yoke and plunger and a pin carried by the plunger and cooperating with the yoke to lock the switch in either th "off" or "on" position.

3. In a device of the kind described, a case, a base of insulating material carried thereby and having cut-away portions adapted to fit a plurality of cells, and a plurality of metallic spring clip members adapted to interconnect the cells and carried by said base.

4. A device of the kind described comprising a casing, a reflector secured to the casing, cells in said casing, a plurality of metallic spring clip members adapted to support and to interconnect said cells, a lamp associated with the reflector, an apertured plate upon which the lamp is carried, one of the before mentioned spring clip members contacting at all times with the base of said lamp, a plurality of guides cooperating with the apertures in said plate, a manually operable screw threaded member secured to the casing and cooperating with a threaded aperture in said plate for moving said plate and said lamp whereby to focus the latter, and a spring engaging the apertured plate and said casing and normally forcing the plate in one direction.

5. In a device of the kind described, a cell, a lamp, means for moving the lamp into focus, and means comprising a clip cooperating with the cell to hold the latter and having a flexible flat spring extension contacting with the lamp and so arranged as to move with the lamp during the focusing operation and to remain in contact with said lamp during the focusing operation.

In testimony whereof, we have signed our names to this specification this 4th day of March, 1922.

WALTER D. KAHN.
GEORGE A. THOMSON.